Figure 1:
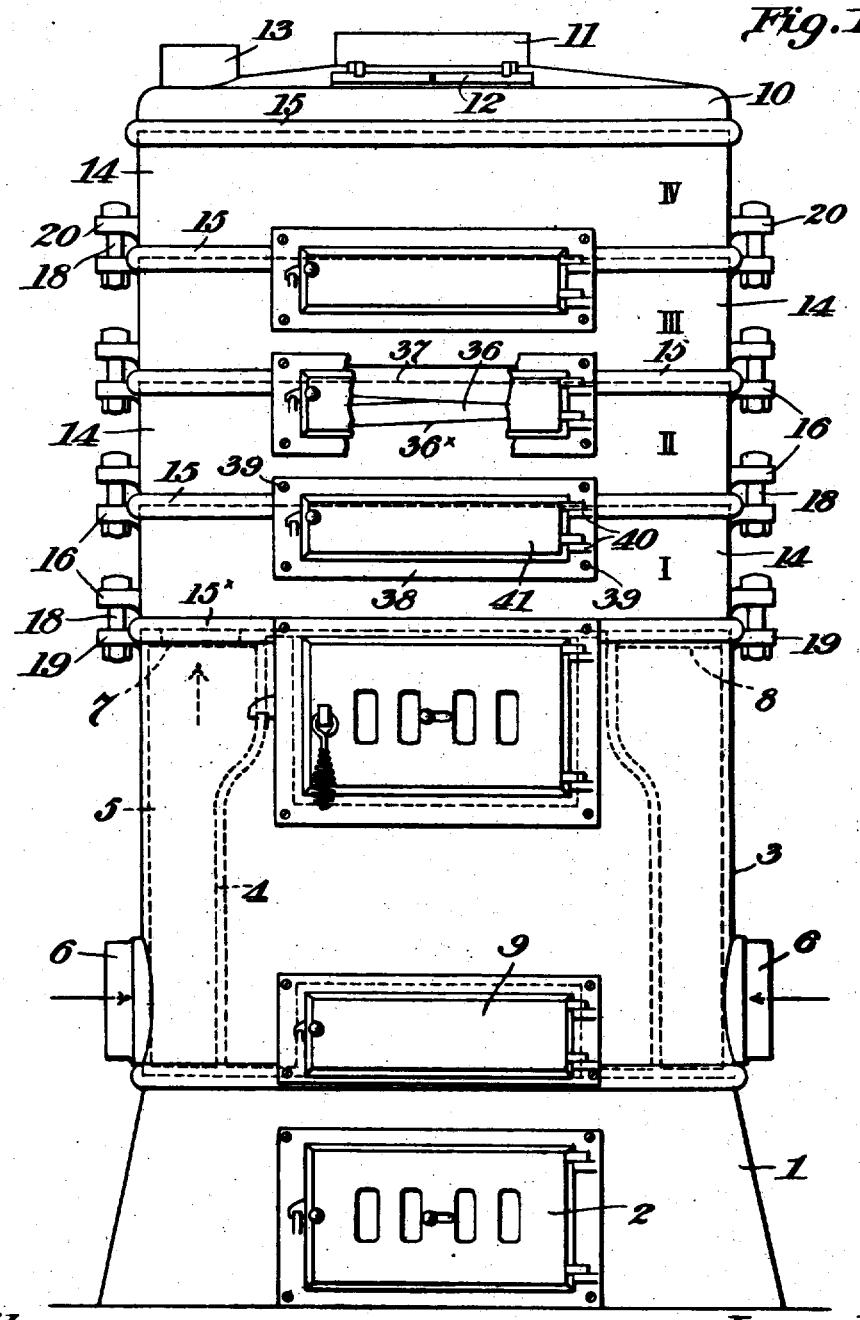

No. 12,632. REISSUED APR. 9, 1907.

E. S. DECKER.

WATER HEATER.

APPLICATION FILED MAR. 19, 1907.

2 SHEETS—SHEET 1.

Witnesses:
Thomas J. Drummond
Joseph M. Ward.

Inventor,
Edwin S. Decker,
By Crosby Gregory Attys.

THE GEORGE PETERS CO., WASHINGTON, D. C.

No. 12,632. REISSUED APR. 9, 1907.

E. S. DECKER.

WATER HEATER.

APPLICATION FILED MAR. 19, 1907.

2 SHEETS—SHEET 2.

Witnesses:

Thomas J. Drummond,

Joseph M. Ward.

Inventor,

Edwin S. Decker, by Crosby Gregory attys.

THE GEORGE PETERS CO., WASHINGTON, D. C.

UNITED STATES PATENT OFFICE.

EDWIN S. DECKER, OF MALDEN, MASSACHUSETTS.

WATER-HEATER.

No. 12,632. Specification of Reissued Letters Patent. Reissued April 9, 1907.

Original No. 845,061, dated February 26, 1907. Application for reissue filed March 19, 1907. Serial No. 363,326.

*To all whom it may concern:*

Be it known that I, EDWIN S. DECKER, a subject of the King of Great Britain, and a resident of Malden, county of Middlesex, State of Massachusetts, have invented an Improvement in Water-Heaters, of which the following description, in connection with the accompanying drawings, is a specification, like letters on the drawings representing like parts.

This invention has for its object the production of a novel sectional water-heater so constructed and arranged that the water circulates in a spiral path and in a relatively thin and broad body, so that the greatest possible amount of heated surface is provided to be traversed by the water.

In the embodiment of my invention herein presented the several superposed sections interposed between the fire-pot or furnace and the top section or dome are each provided with a spiral water-chamber, the top and bottom of which are arranged in parallelism within a cylindrical inclosing wall, the latter forming also the peripheral wall of the water-chamber.

Each chamber is provided with an inlet-port and an outlet-port, said ports being vertically alined and within the inclosing wall of the section, a substantially horizontal diaphragm separating the ports and forming practically a continuation of the lower part of the top of the chamber, thereby presenting the minimum obstruction to the free flow of the water as it passes from one to the next chamber.

Suitable flues extend through the chambers for the passage of the products of combustion from the furnace, the flues of adjacent sections being non-alined or out of register, so that the products of combustion are compelled to traverse the heater in an irregular path to impinge upon all parts of the top and bottom of each water-chamber.

A partition or division wall is arranged in each chamber, so that the water entering at the bottom through the inlet-port must traverse the inlet half of the chamber in a semicircular and gradually-rising path before it enters the outlet half, in which latter it again takes a semicircular and rising path to the outlet-port. I have also provided simple and efficient means for firmly sustaining each section on the section below at diametrically opposite points, irrespective of the contact between the peripheral edges of the inclosing walls of the two adjacent sections.

As will appear hereinafter, the arrangement of the water-chambers provides for a practically unobstructed smoke-compartment between each pair of water-chambers, so that soot and other deposited matter can be readily removed through suitable clean-out openings in the inclosing walls of the several sections.

The various novel features of my invention will be fully described in the subjoined specification and particularly pointed out in the following claims.

Figure 2:
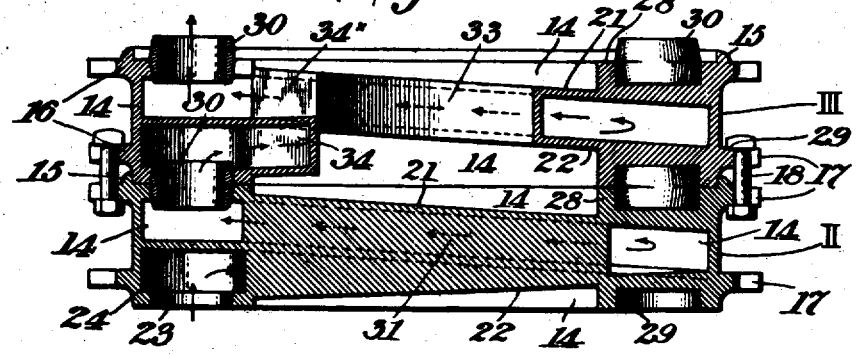
Figure 3:
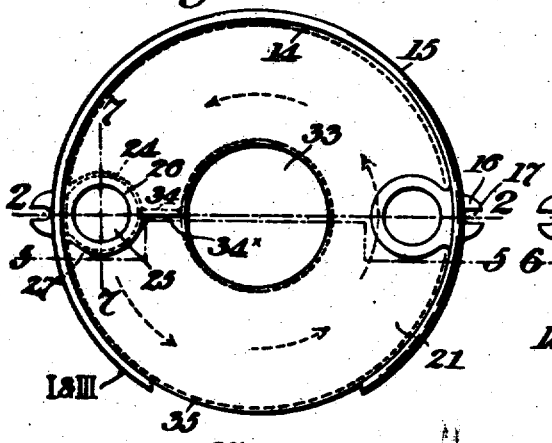
Figure 4:
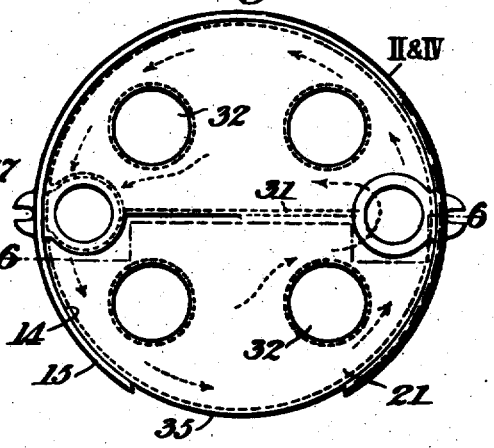
Figure 5:
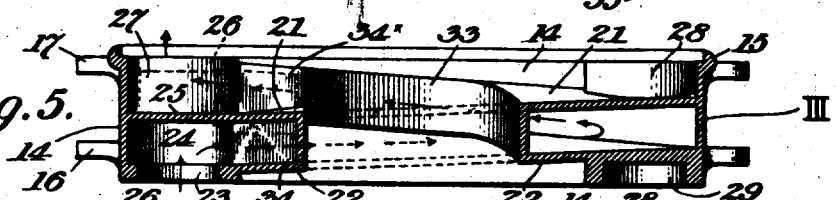
Figure 6:
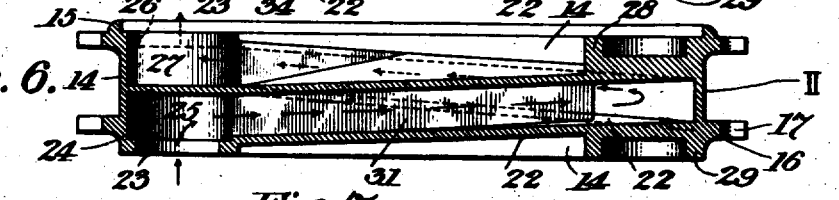
Figure 7:
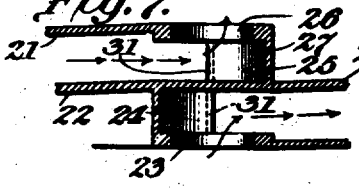

Figure 1 is a front elevation of a water-heater embodying one practical form of my invention, the double wall of the fire-pot or furnace being partly indicated by dotted lines. Fig. 2 is a diametral vertical section, somewhat enlarged, on the line 2 2, Fig. 3, and taken through two of the sections. Fig. 3 is a top plan view of the upper one of the sections shown in Fig. 2. Fig. 4 is a similar view of the lower section shown in Fig. 2. Fig. 5 is an enlarged vertical sectional detail on the irregular line 5 5, Fig. 3. Fig. 6 is a similar sectional detail on the line 6 6, Fig. 4. Fig. 7 is an enlarged sectional detail on the line 7 7, Fig. 3, looking toward the right.

Referring to Fig. 1, the metallic base 1, having a door 2, constitutes the ash-pit, on which is mounted the cylindrical fire-pot or furnace 3, (shown in dotted lines as double-walled at 4,) to form a water jacket or receptacle 5 around the fire, suitable inlets 6 leading to the water-jacket being in practice tapped for the supply-pipes. (Not shown.) An outlet 7 for the water-jacket is formed at its upper end to form a tubular outlet-port and is located adjacent the furnace-wall, and diametrically opposite a blind boss 8 is formed on the top of the furnace casting or section for a purpose to be described, the furnace-section 3 having a suitable feed-door 9. The top section or dome 10 has, as herein shown, a central flue 11 for connection with a suitable pipe (not shown) to carry away the products of combustion, and a clean-out opening closed by a suitable door 12 is shown in Fig. 1, the top section also having at one side of the center an outlet 13 for the water. Between the furnace and top sections I interpose a series of intermediate sections of peculiar construction, and as these sections are alike in general features, but differ in one or two particulars, I have illustrated and will describe in detail the intermediate sections to show clearly the differences. For convenience I have designated the four intermediate sections as I, II, III, and IV on Fig. 1, sections I and III being exactly alike, but differing in certain features from sections II and IV, which are alike, it being understood that I can use two intermediate sections—four, six, or an even number, according to the required capacity of the heater. Each intermediate section comprises a cylindrical inclosing wall 14, having at its upper edge an annular upturned flange 15, the lower edge of a section resting on the upper edge of the section below it and within its flange 15, as shown in Fig. 2. A pair of notched ears 16 project laterally from the inclosing wall at diametrically opposite points, the ears and notches 17 being vertically alined to receive clamping-bolts 18, by means of which the several sections are clamped together. As in Fig. 1, the furnace-section 3 has at its top notched ears 19, and the top section 10 has similar ears 20 near its bottom to coöperate with the clamping-bolts 18 of the adjacent intermediate sections, as will be readily understood from Fig. 1, and a flange 15× on the furnace-section receives within it the lower portion of the wall of section I. Each section is made as a casting, and the inclosing wall 14 thereof forms the peripheral wall of a spiral water-chamber formed by spiral and parallel top and bottom portions 21 22, the inlet half of each water-chamber being semicircular and gradually rising from the lower part of the section to a point diametrically opposite the inlet-port, to be referred to, and then the outlet half gradually rises from such point in a half-spiral to the outlet-port.

The inlet-port is formed by a tubular boss 23, cast on the bottom 22 of the water-chamber at its lowest portion, and opening into the chamber a semicircular wall 24, Figs. 6 and 7, continuing upward to a substantially horizontal diaphragm 25, which in practice forms a continuation of the lower portion of the top 21 of the water-chamber. This diaphragm separates the inlet and outlet ports, the latter being formed by a tubular boss 26 on the top 21 and vertically alined with the inlet-port, a semicircular wall 27 continuing downward from the top to the diaphragm 25; but the walls 24 and 27 are oppositely turned, so that the water entering the inlet-port is directed to the inlet half of the water-chamber, while the water from the outlet half thereof is turned by the wall 27 to the outlet-port 26. By making the diaphragm substantially horizontal, as shown, the alined ports are separated, and the incoming water is turned directly into the inlet half of the water-chamber with the least resistance. The annular faces of the bosses which form the ports are flush with the upper and lower edges, respectively, of the inclosing wall 14, as shown in Figs. 2, 5, and 6, and it will be noted from these and other figures that the ports are wholly within the inclosing wall 14. Vertically-alined and blind bosses 28 29 are formed on the top and bottom, respectively, of each water-chamber within the wall 14 and diametrically opposite the ports, the faces of the blind bosses being flush with the upper and lower edges of the wall. When one section is superposed upon another, the inlet-port 23 and blind boss 29 of the upper section seat upon the outlet-port 26 and boss 28 of the lower section, while the annular edges of the walls 14 register, the bosses serving to equalize the strain when the clamping-bolts are set up, and afford an additional supporting-surface. A double-tapered nipple, as 30, Fig. 2, forms a connection between one outlet-port and the inlet-port of the next adjacent section, the tapered ends of the nipple fitting tightly into the ports and preventing any leakage thereat. Like nipples 30 are used with the opposed blind bosses, but only to assist in positioning the sections, it being clear from the illustration in Figs. 2, 5, and 6 that there is no communication between the water-chambers at the right-hand side of the heater.

It is of course necessary to cause the water to traverse each chamber completely in a spiral path, and to secure this effect I provide a division-wall between the top and bottom of the chamber. In the sections II and IV this division-wall is shown at 31 31×, the triangular portion 31× extending from the inclined upper surface of the top 21 at one side of the diametral axis of the section to the oppositely-inclined portion of the top, the said portion 31× joining the curved wall 27, as best shown in Fig. 6 and as shown in Fig. 4 in plan. This division-wall extends diametrically across the section from the ports and is wholly in section, Fig. 2, as that view is taken on the line 2 2, Fig. 3. It will be manifest that the water entering the lowest portion of the chamber at 23 must flow in a semicircular and gradually-rising path as it traverses the inlet half of the water-chamber, along one side of the wall 31 and then turning around its extreme right-hand end, Fig. 2, it flows along the opposite side in a semicircular and gradually-ascending path to the outlet port or passage 26 and thence through the connection 30 to the inlet-port of the water-chamber above it, as shown by the dotted arrows in Fig. 4. The sections II and IV are provided with tubular flues or openings 32, which extend through the water-chamber, four of such openings or flues being shown in Fig. 4 arranged nearer the inclosing wall 14, the products of combustion passing by means of such flues from the lower to the upper side of the chamber. The other sections, as I and III, have each a single centrally-located flue 33, considerably larger in diameter than one of the flues 32, and in these sections the division-wall 34 extends only from the inner edge of the curved wall 24 to the portion of the casting which forms the wall of the flue 32, between the top 21 and bottom 22, (see Fig. 5,) and the exposed portion 34× of the wall corresponds to the part 31× in the sections II and IV. It will be seen from the dotted arrows in Fig. 3 that the radial partition or division wall 34 34× and the circular wall forming the flue 33 direct the water in a spiral current through the chamber from inlet to outlet.

By the arrangement of flues described the flue-openings of two adjacent sections are non-alined or located out of register, so that the products of combustion must take an irregular and circuitous route in passing from the furnace-section through the intermediate sections to the top section, thereby impinging upon all portions of the top and bottom of each water-chamber. A maximum heating-surface is thereby secured, the water passing up through the heater in a ribbon-like spiral, the body of water in circulation being relatively thin or shallow and broad, so as to obtain the most efficient heating thereof. All the connections between the water-chambers are located within the cylindrical inclosing walls 14 of the sections, simplifying the construction, making it more compact and easier to maintain water-tight. The heating-compartments between two adjacent water-chambers will in time collect soot, dust, and other solid matter, which must be removed from time to time, and by providing the intermediate sections with clean-out openings normally closed by suitable doors the removal of such solid matter is readily effected.

Referring to Figs. 3 and 4, the flanges 15 are interrupted or cut away at 35, and the wall 14 is interrupted to form a large opening 36, Fig. 1, extending from the flange downward, while an opening 37 of the same length, but of much less depth, is formed in the lower part of the wall. When two sections are superposed, the opening 37 of the upper section registers with the opening 36 of the lower section, forming a clean-out, and a door-frame 38 is secured by screw-bolts 39 to the two sections. Said frame has ears 40 for the hinge-pintles of a door 41, by which the clean-out opening is normally closed, and it will be clear that when such door is opened there is a clear and unobstructed space between the top of one water-chamber and the bottom of the water-chamber next above it, so that a scraper, rake, or other suitable cleaning implement can be used without the slightest difficulty.

By referring to Fig. 1 it will be seen that the lower edge of the opening 36 is inclined, as at 36×, said edge being flush with the adjacent portion of the top 21 of the water-chamber, so that with a scraper or other tool the dust, &c., can be withdrawn directly from the top of the chamber.

Having fully described my invention, what I claim as new, and desire to secure by Letters Patent, is—

1. In a water-heater, a series of superposed sections each comprising a cylindrical inclosing wall and a spiral water-chamber within it provided with vertically-alined tubular inlet and outlet ports, also within the wall, a dividing-diaphragm between the ports formed by a continuation of the lower portion of the top of the chamber, a connection between the outlet-port of one chamber and the inlet-port of the chamber next above, a separating-wall between the top and bottom of each chamber to cause the water to traverse the inlet half of each chamber before passing to the outlet half, and tubular and non-alined flues through the chambers for the products of combustion.

2. In a water-heater, a series of superposed sections each comprising a cylindrical inclosing wall and a spiral water-chamber within it provided with vertically-alined tubular inlet and outlet ports, also within the wall, a dividing-diaphragm between the ports formed by a continuation of the lower portion of the top of the chamber, a connection between the outlet-port of one chamber and the inlet-port of the chamber next above, a separating-wall between the top and bottom of each chamber to cause the water to traverse the inlet half of each chamber before passing to the outlet half, vertically-alined blind bosses on the top and bottom of each chamber diametrically opposite the inlet and outlet ports thereof, a boss and port at the bottom of one chamber being supported on a boss and port at the top of the chamber next below, external means to clamp adjacent sections together, and non-alined, tubular flues through the several chambers, for the passage of the products of combustion.

3. The combination, in a sectional water-heater, of a furnace and a top section, a series of intermediate sections interposed between them and superposed one upon the other, each intermediate section comprising a cylindrical inclosing wall and a water-chamber having a spiral top and bottom arranged in parallelism and provided with an upright wall to cause the water to traverse the lower half of the chamber before entering the upper half, an inlet-port opening into the bottom of each chamber and an outlet-port communicating with the top thereof, said ports being vertically alined within the cylindrical wall of each casing, a connecting-nipple between the outlet-port of one chamber and the inlet-port of the chamber next above it, and non-alined tubular flues through the several chambers for the passage of the products of combustion, the cylindrical wall of each section having a clean-out opening therein above the top of the water-chamber forming a part of such section.

4. A section for water-heaters, consisting of a cylindrical inclosing wall and a water-section having a spiral top and bottom arranged in parallelism and extending to the wall, a separating-wall between the top and bottom to cause the water to traverse the inlet half of the chamber before passing to the outlet half, vertically-alined tubular inlet and outlet ports for the chamber, opening respectively into the inlet and outlet halves thereof, and a substantially horizontal diaphragm dividing the ports and forming a continuation of the lower portion of the top of the chamber.

5. In a water-section, a series of superposed sections each comprising a cylindrical inclosing wall and a water-section having a spiral top and bottom arranged in parallelism and extending to the wall, means to cause the water to traverse the inlet half of each chamber before passing to the outlet half thereof, vertically-alined inlet and outlet ports for each chamber, a connection between the outlet-port of one chamber and the inlet-port of the chamber next above, and a clean-out opening in the wall of each section having its lower edge flush with the adjacent portion of the top of its own water-chamber.

In testimony whereof I have signed my name to this specification in the presence of two subscribing witnesses.

EDWIN S. DECKER.

Witnesses:
JOHN C. EDWARDS,
ELIZABETH R. MORRISON.